United States Patent

Ohkubo

[19]

[11] Patent Number: 5,851,656
[45] Date of Patent: Dec. 22, 1998

[54] MAGNETIC RECORDING MEDIUM

[75] Inventor: Keiji Ohkubo, Nagano, Japan

[73] Assignee: Fuji Electric Co., Ltd., Japan

[21] Appl. No.: 782,744

[22] Filed: Jan. 13, 1997

[30] Foreign Application Priority Data

Jan. 12, 1996 [JP] Japan ................................ 8-003517

[51] Int. Cl.$^6$ ................................................ G11B 5/66
[52] U.S. Cl. .................. 428/332; 428/336; 428/694 T;
428/694 TR; 428/694 TS; 428/694 SG;
428/694 TM; 428/900
[58] Field of Search ..................... 428/694 T, 694 TR,
428/694 TS, 694 SG, 694 JM, 332, 336,
900

[56] References Cited

U.S. PATENT DOCUMENTS

| 5,051,288 | 9/1991 | Ahlert | 428/65.7 |
| 5,298,324 | 3/1994 | Ivett et al. | 428/336 |
| 5,370,928 | 12/1994 | Funabashi | 428/336 |
| 5,580,667 | 12/1996 | Lal | 428/610 |
| 5,607,740 | 3/1997 | Nodo | 428/65.3 |

FOREIGN PATENT DOCUMENTS

| 5-101366 | 4/1993 | Japan . |
| 6-44548 | 2/1994 | Japan . |

OTHER PUBLICATIONS

Journal of the Japan Association of Applied Magnetics 87th research Materials Issu (Oct., 1994) (japanese edition) Abst, included, Title Microstructure and the Properties of CoNi-CrTa Multilayer Media.

IEEE Transactions On Magnetics, vol. 26, No. 5, Sep. 1990 (pp. 2700–2705). Noise Properties Of Multilayered Co Alloy Magnetics Recording Media.

J. Appl. Phys. 67 (9), May 1, 1990 (pp. 4692–4694). Low–Noise Media Using Double–Layer CoNiCr Thin Films For Longitudinal Recording.

IEEE Transactions on Magnetics vol. 29, No. 6, Nov. 1993 (pp. 3679–3681). Flash Chromium Interlayer for High Performance Disks with Superior Noise and Coercivity.

*Primary Examiner*—Leszek Kiliman
*Attorney, Agent, or Firm*—Rossi & Associates

[57] ABSTRACT

A magnetic recording medium is provide which includes at least a base layer and a multiple-film magnetic layer formed on a substrate. The multiple-film magnetic layer includes two to six magnetic films formed of a material selected from CoNiCrTa alloy, CoCrPt alloy and CoCrTaPt alloy. The magnetic films are laminated on each other with a non-magnetic intermediate layer interposed between each pair of the magnetic films. The non-magnetic intermediate film is formed of a Cr alloy containing an element selected from Mo, Ta, Ti and W.

14 Claims, 5 Drawing Sheets

MAGNETIC RECORDING MEDIUM

FIELD OF THE INVENTION

The present invention relates to a magnetic recording medium, such as a hard disc, which is mounted in an external memory of a computer, and a method for manufacturing such a recording medium. In particular, this invention is concerned with a magnetic recording medium having a multiple-film magnetic layer and a method for manufacturing the same.

BACKGROUND OF THE INVENTION

Techniques for increasing the recording density of a magnetic recording medium for a computer have been considerably developed in recent years, and the magnetic recording medium with such a high recording density is required to exhibit a high coercive force (Hc) and low noise. FIG. 9 is a cross sectional view showing the cross sectional structure of a general magnetic recording medium known in the art. To produce this magnetic recording medium, a Ni—P plated layer 2 is formed on an Al—Mg alloy base 1, and the plated layer 2 is mirror-finished by machining and then formed with minute protrusions and recesses by texturing, to thus form a substrate. Thereafter, a Cr base layer 3, magnetic layer 4, and protective layer 5 are successively formed on the substrate by sputtering, and the protective layer 5 is coated with a lubrication layer 6. The magnetic layer 4 has a single-film structure consisting of a CoCrTa alloy film, for example.

The magnetic recording medium using the single film of CoCrTa alloy as the magnetic layer 4 is a low-noise medium, but its coercive force Hc has a limit up to 2200 Oe. While magnetic materials having CoCrPt, CoNiCrTa, and CoCrTaPt systems respectively, have a high coercive force, these materials suffer from higher noise than that having the CoCrTa system, and are thus difficult to be used as they are for the magnetic media that satisfy the high recording density requirement.

To solve the above problem, the inventors of the present invention has studied a magnetic layer having a multiple-film structure in which magnetic films are laminated via non-magnetic intermediate films, rather than the above-described magnetic layer 4 consisting of the single layer made of the magnetic material having a high coercive force.

The multiple-film type magnetic layer is able to provide a high-coercive, low-noise medium. In this magnetic layer, however, each non-magnetic or magnetic film is thin, and the crystal lattices of the non-magnetic intermediate films do not match those of the magnetic films, resulting in insufficient crystal orientation. Consequently, the multiple-film type magnetic layer has a small coercive force angle ratio S* (0.80 or less), and exhibits unsatisfactory recording and reproducing characteristics, such as O/W·Pw50. Further, the multiple-film structure restricts the upper limit of the coercive force as an inherent magnetic characteristic of the magnetic recording medium.

SUMMARY OF THE INVENTION

In view of the above problems, it is an object of the present invention to provide a magnetic recording medium which includes a magnetic layer having a multiple-film structure and using a high-coercive-force material (CoCrPt alloy, CoNiCrTa alloy, or CoCrTaPt alloy), and which exhibits a high coercive force ($2400\ Oe \leq Hc \leq 3200\ Oe$) and a high coercive force angle ratio ($0.80 \leq S^* \leq 0.95$), while providing a low noise characteristic where the level of the noise is equivalent to or smaller than that of a low-noise magnetic recording medium using a CoCrTa material.

The above object may be attained according to the principle of the present invention, which provides a magnetic recording medium which employs a magnetic layer having a multiple-film structure in which a plurality of magnetic films are laminated on each other via non-magnetic intermediate film(s) formed of Cr and X where X is selected from Mo, Ta, Ti and W, rather than a magnetic layer having a single-layer structure.

The magnetic films are desirably formed of the above-described high-coercive-force material, such as CoCrPt alloy, CoNiCrTa alloy or CoCrTaPt alloy, and the magnetic layer desirably includes two to six magnetic films that are separated from each other by the non-magnetic intermediate film(s) formed of Cr and X.

It is also desirable that the film thickness of the non-magnetic intermediate film be in the range of 5 Å to 50 Å, and that the ratio of the film thickness between an arbitrarily selected pair of the magnetic films be in the range of 80% to 120%. The magnetic films are preferably formed so as to provide substantially the same coercive force.

In the magnetic recording medium of the present invention in which the magnetic films of the magnetic layer are separated from each other by the non-magnetic intermediate film(s) interposed therebetween, the magnetic interaction in the vertical direction within the magnetic layer can be advantageously reduced. The magnetic interaction between magnetic particles can be also weakened if the thickness of the non-magnetic intermediate film is reduced and the intermediate film takes the form of mutually isolated film portions. Further, the medium noise is reduced due to the above two factors. Since each pair of the magnetic films are separated by the non-magnetic film, the thickness of each magnetic film is reduced, and the isolation between the magnetic particles is increased, thus assuring an increased coercive force. Moreover, the use of Cr—X (X: Mo, Ta, Ti, W) for the non-magnetic intermediate film(s) leads to increased crystal orientation of the Co magnetic layer, and thereby achieves a sufficiently high coercive force angle ratio.

BRIEF DESCRIPTION OF THE DRAWINGS

The invention will be described in greater detail with reference to a certain preferred embodiment thereof and the accompanying drawings, wherein.

DESCRIPTION OF THE PREFERRED EMBODIMENT

Figure 1:
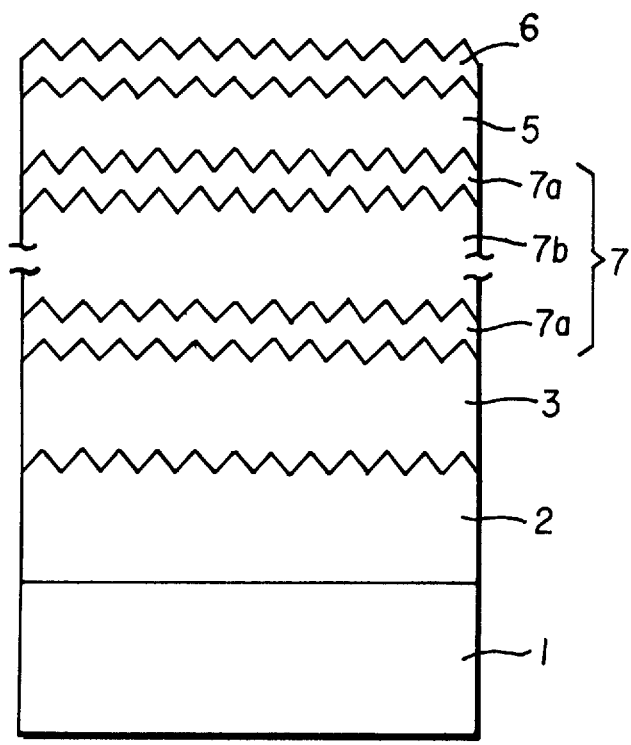
FIG. 1 is a cross sectional view showing the structure of a magnetic recording medium according to one embodiment of the present invention.

There will be described in detail one preferred embodiment of the present invention, referring to the accompanying drawings. FIG. 1 is a schematic view showing a cross sectional structure of a magnetic recording medium as the preferred embodiment of the invention. To produce this magnetic recording medium, a Ni—P plated layer 2 is formed on a disc-like Al—Mg alloy base 1, and the plated layer 2 is mirror-finished by machining, and then formed with minute protrusions and recesses by texturing in the circumferential direction of the base, to thus form a substrate. Thereafter, a Cr base layer 3, multiple-film magnetic layer 7, and protective layer 5 are successively formed on the substrate by sputtering, and a lubrication layer 6 is applied by coating to the obtained layered structure. The texturing process is conducted with respect to the surface of the substrate so as to rectify the magnetic anisotropy of magnetic films formed thereon to thereby improve the coercive force. At the same time, the minute protrusions and recesses formed in the substrate surface are reflected on the medium surface after the above layers 3, 7, 5 and 6 are formed on the substrate, so as to reduce the friction between the medium surface and a magnetic head to be used with the recording medium.

The above-indicated multiple-film magnetic layer 7 consists of two to six magnetic films 7a that are laminated on each other with non-magnetic intermediate films 7b interposed between adjacent ones of these films 7a. The magnetic film 7a is formed of a magnetic material having a high coercive force, more specifically, an alloy having a CoCrTaPt system (Cr: 11%, Ta: 4%, Pt: 3%, Co: 82%).

Figure 2:
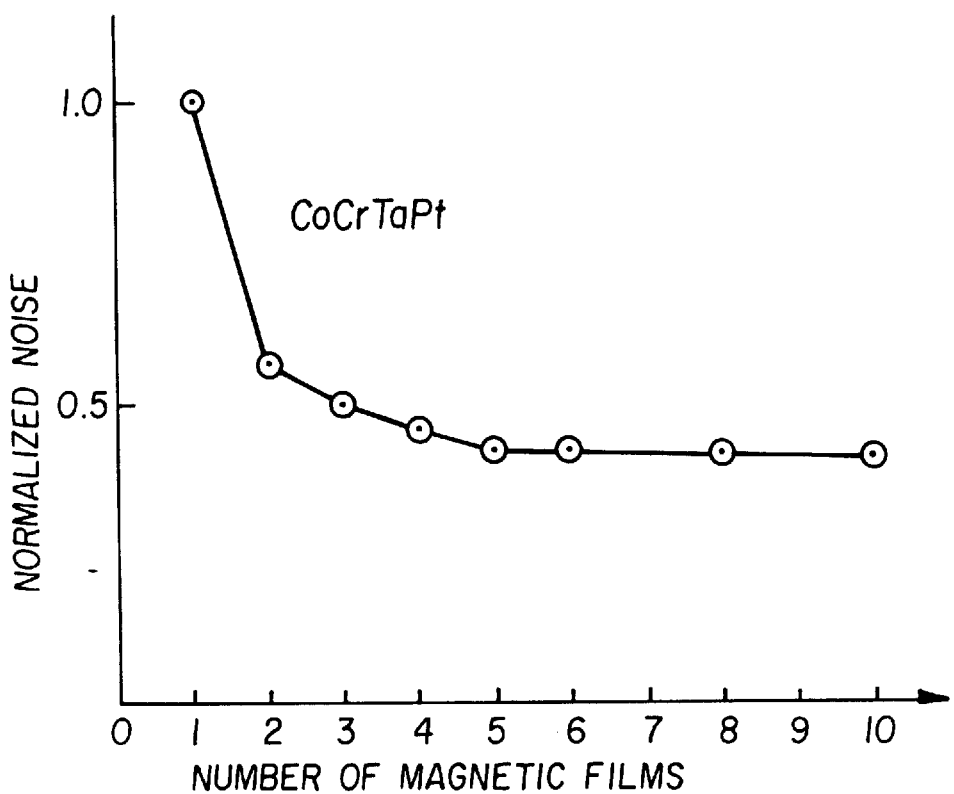
FIG. 2 is a graph showing the relationship between the number of magnetic films of a multiple-film magnetic layer and normalized noise.

FIG. 2 is a graph showing a change in medium noise as the number of the CoCrTaPt magnetic films 7a of the multiple-film magnetic layer 7 is varied where each of the non-magnetic intermediate films 7b consists of a 18 Å-thickness Cr-8 at % W layer. The medium noise is normalized so that it becomes 1.0 when the number of the films 7a is 1. As is understood from this graph, the noise is rapidly reduced when the number of the films 7a is 2 or larger, and is saturated when the film number is 6 or larger. Thus, the increase in the number of the magnetic films 7a to a value larger than 6 does not lead to an outstanding effect of reducing the medium noise, but results in an increased cost of manufacturing due to increased steps of forming the films. For these reasons, the number of the magnetic films is preferably selected in the range of 2 to 6.

Figures 3A, 3B:
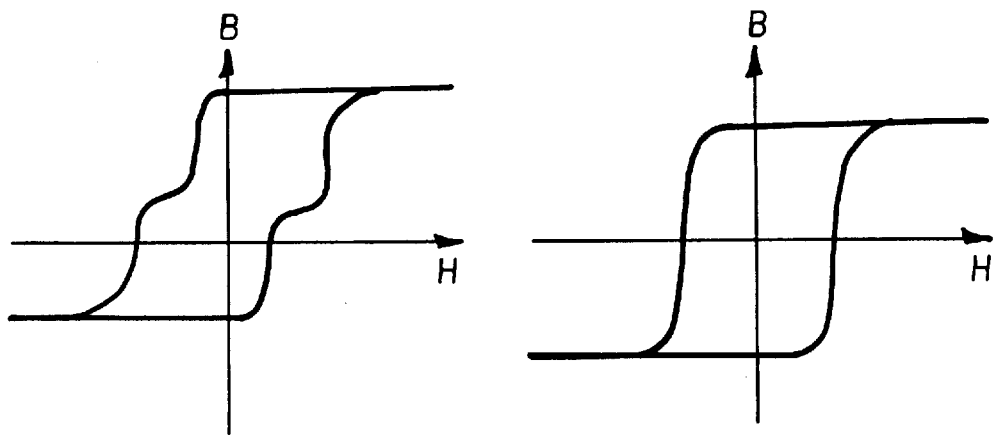
FIGS. 3(a) and 3(b) are views comparing magnetic curves of magnetic recording media formed under different conditions.

In producing the multiple-film magnetic layer 7 by repeatedly effecting the step of forming the non-magnetic intermediate film 7b on the magnetic film 7a by sputtering, it is important to provide the same coercive force between each pair of the magnetic films 7a separated by the intermediate film 7b. FIGS. 3(a) and 3(b) show magnetization curves (B-H loop) obtained when the multiple-film magnetic layer 7 includes two magnetic films 7a. If the magnetization curve (B-H loop) has stepped portions as shown in FIG. 3(a), the overwrite (O/W) characteristic as a recording and reproducing characteristic, medium noise and others are deteriorated. To overcome this problem, film-forming conditions, such as a bias current of a sputtering device or a magnet current of a magnetic cathode, for forming the respective magnetic films 7a of the multiple-film magnetic layer 7 are controlled so that the same coercive force appears between each pair of the magnetic films 7a, thereby to realize a magnetization curve having no stepped portion as shown in FIG. 3(b). The realization of such a magnetization curve is one of the requirements for obtaining excellent magnetic characteristics as shown in FIG. 2.

Figure 4:
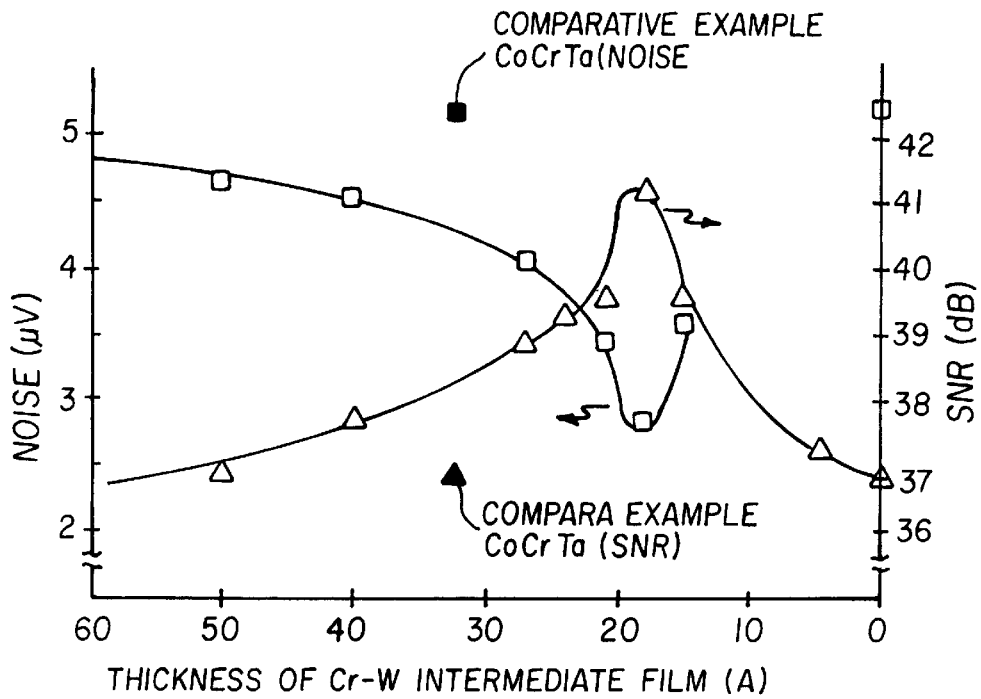
FIG. 4 is a graph showing the relationship between the thickness of a non-magnetic intermediate film made of Cr and W and a noise characteristic of the recording medium.

FIG. 4 is a graph showing the noise characteristic and the signal to noise ratio (SN ratio) in relation to the thickness of the non-magnetic intermediate film 7b, where the multiple-film magnetic layer 7 has two magnetic films 7a, and the intermediate film 7b is formed of Cr and 8 at % of W. The noise characteristic and SN ratio of Comparative Example 1 shown in FIG. 4 are those of a low-noise CoCrTa medium. As is apparent from this graph, the magnetic recording medium of the present embodiment having the multiple-film magnetic layer 7 exhibits lower noise than the CoCrTa medium of Comparative Example when the thickness of the intermediate Cr—W film 7b is in almost the entire range of 5-50 Å.

Figure 5:
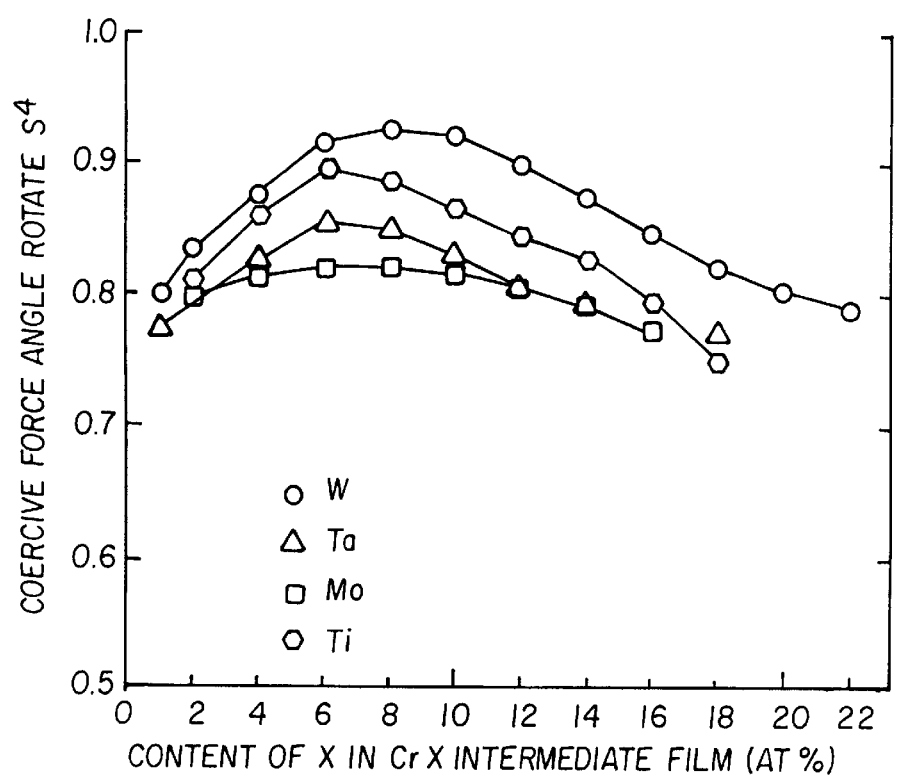
FIG. 5 is a graph showing the relationship between the content of an element X in a Cr—X nonmagnetic intermediate film and the coercive force angle ratio S*.

FIG. 5 is a graph showing the relationship between the amount of X element added to Cr in an 18 Å-thickness Cr—X non-magnetic intermediate film (X: Mo, Ta, Ti or W) and the coercive force angle ratio S*. It is apparent from this graph that the coercive force angle ratio S* reaches its maximum at a given amount of the X element and is reduced with further addition of the X element no matter which element is added to Cr to form the intermediate film. This is because the degree of mismatch between the crystal lattices of the Cr intermediate film and the Co-containing magnetic film is reduced due to addition of the X element, but is increased again if the amount of the X element added exceeds the given value. To assure a sufficiently high coercive force angle ratio S* (0.80 or larger), the content of the X element (selected from Mo, Ta, Ti and W) in the non-magnetic intermediate film 7b is preferably controlled such that Mo is in the range of 2 at % to 12 at %, or Ta is in the range of 2 at % to 12 at %, or Ti is in the range of 2 at % to 15 at %, or W is in the range of 1 at % to 20 at %. More preferably, the content of the selected X in the Cr—X intermediate film is controlled such that Ta is in the range of 6 at % to 8%, Ti is in the range of 4 at % to 11 at %, or W is in the range of 3 at % to 15 at %, so as to realize the coercive force angle ratio S* of not smaller than 0.85.

Figure 6:
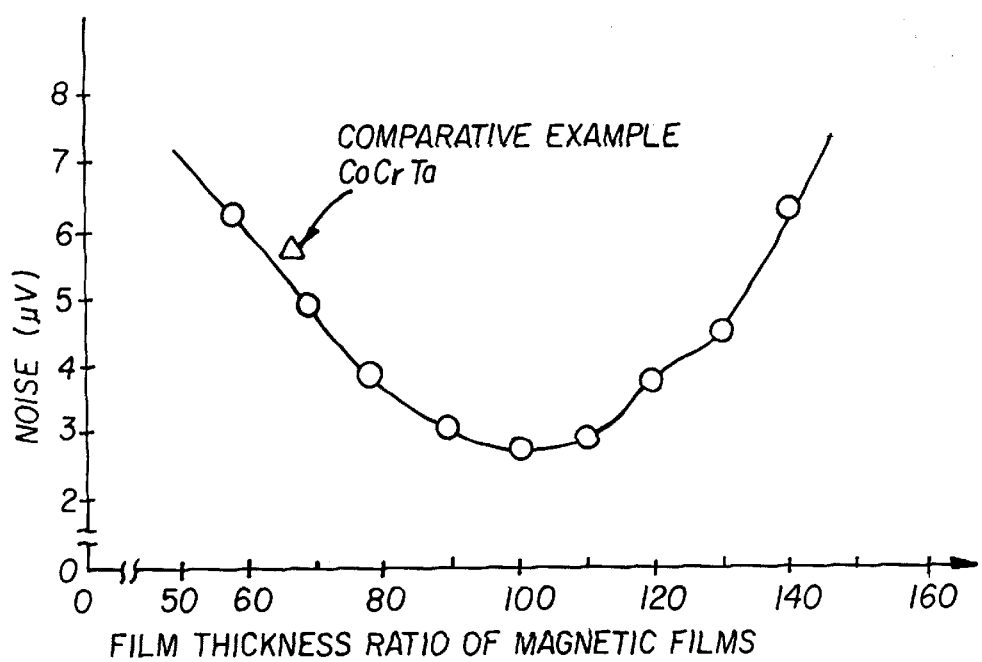
FIG. 6 is a graph showing the ratio of the film thickness of the magnetic films and the noise characteristic of the recording medium.

FIG. 6 is a graph showing the noise characteristic of the magnetic recording medium in relation to the ratio of the film thickness between two magnetic films 7a of the multiple-film magnetic layer 7. When the ratio of the film thickness is 100%, namely, the two magnetic films 7a have the same thickness, the noise of the resulting medium is reduced to the minimum. Since a good noise characteristic can be obtained when the ratio of the film thickness is in the range of 70 to 130%, a favorable low-noise recording medium can be produced even with a variation (±10%) in the thickness that occurs in the sputtering process step for forming the films.

Figure 7:
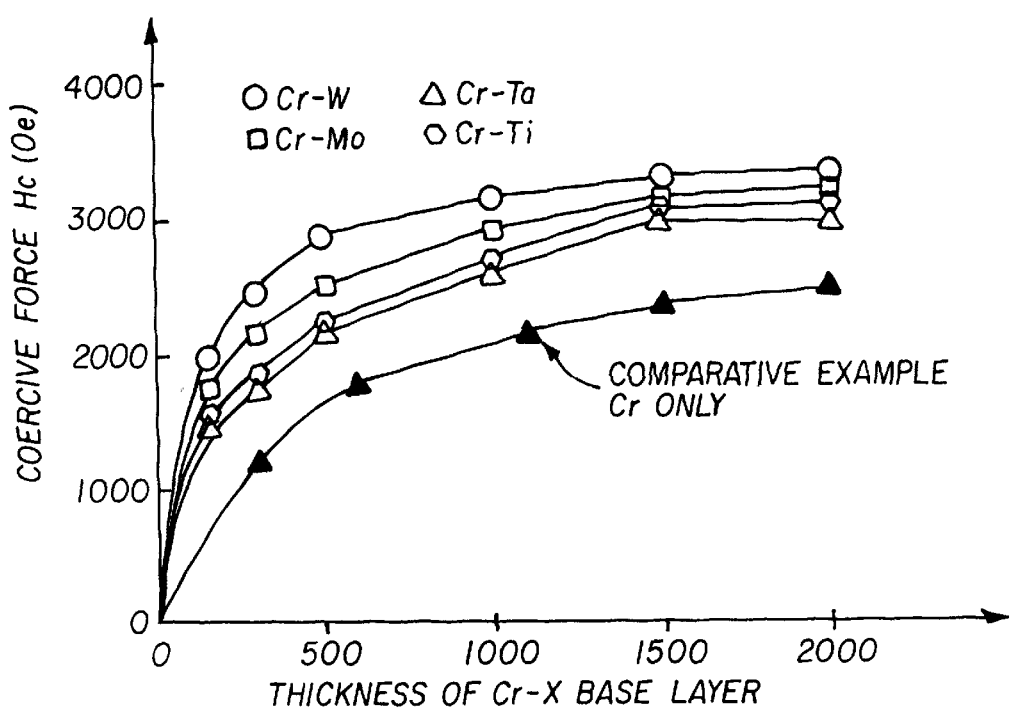
FIG. 7 is a graph showing the relationship between the thickness of a Cr—X base layer and the coercive force.

FIG. 7 is a graph showing the relationship between the thickness of a Cr—X base layer 3 and the coercive force when the multiple-film magnetic layer 7 has two magnetic films 7a and the base layer 3 is changed from the Cr layer to the Cr—X layer as used for the non-magnetic intermediate film 7b. As is apparent from FIG. 7, the coercive force increases with an increase in the film thickness of the Cr—X base layer 3, and reaches 3000 Oe or larger when the thickness of the Cr—X base layer is 2000 Å. Thus, the coercive force of the recording medium can be further increased by using the Cr—X layer as the base layer 3 as well as the non-magnetic intermediate film 7b, instead of using the Cr layer as the base layer 3.

Figure 8:
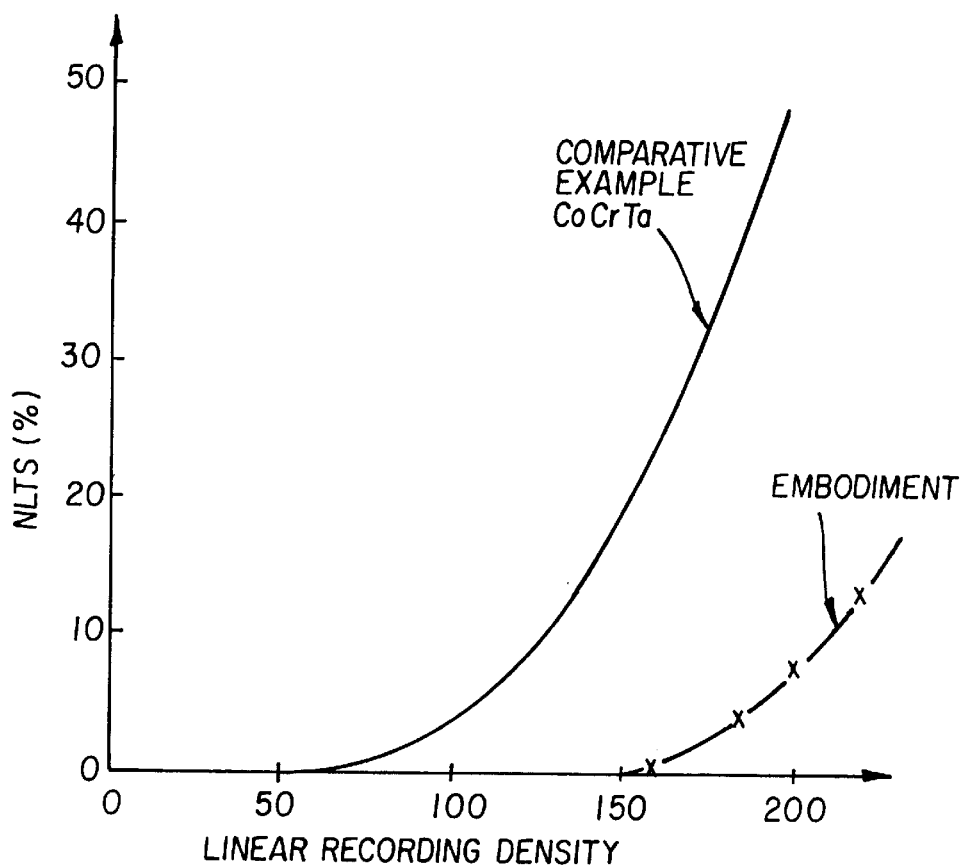
FIG. 8 is a graph showing the linear recording density and the non-linear transition shift.
Figure 9:
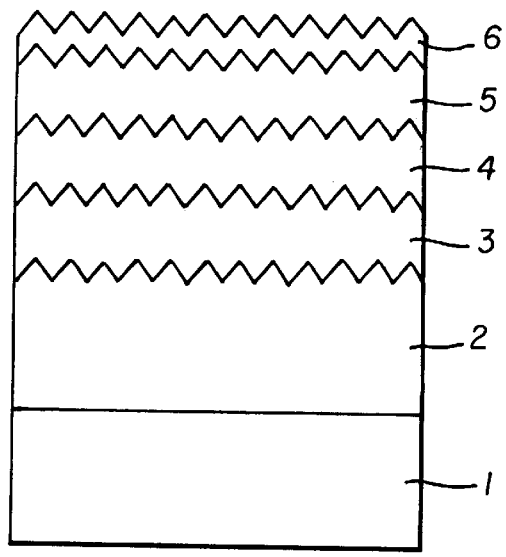
FIG. 9 is a cross sectional view showing the structure of a general magnetic recording medium known in the art.

FIG. 8 is a graph showing the non-linear transition shift (NLTS) with respect to the recording density of the medium of the present embodiment including the multiple-film magnetic layer 7 having two magnetic films 7a, and that of the low-noise CoCrTa medium (Comparative Example). The magnetic recording medium, when used with a magnetic resistance type thin-film head (MR head) for attaining a high recording density, is required to exhibit a small non-linear transition shift. As is understood from FIG. 8, the NLTS of the recording medium of the present embodiment having a linear recording density of 195 kFCL is 8.0% whereas the NLTS of the known CoCrTa medium having the same recording density is 46.4%. Thus, the present recording medium shows a sufficiently small non-linear transition shift even with a high recording density.

While the multiple-film magnetic layer 7 of the illustrated embodiment has the magnetic films 7a having a CoCrTaPt system, the recording medium in which the magnetic films 7a are formed of a material having a CoNiCrTa system (Ni: 25 at %, Cr: 10 at %, Ta: 2 at %, Co: 63 at %) or a CoCrPt system (Cr: 14 at %, Pt: 7 at %, Co: 79 at %) exhibits similar characteristics to the recording medium of the illustrated embodiment.

As described above, the magnetic recording medium according to the present invention has a multiple-film magnetic layer having two to six magnetic films that are laminated via non-magnetic film(s), and the non-magnetic intermediate layer is formed of Cr and X where X is selected from Mo, Ta, Ti and W, whereby the resulting medium provides a high coercive force angle ratio. The magnetic films are formed of a high coercive force material having CoNiCrTa system, CoCrPt system or CoCrTaPt system, and the coercive forces of the magnetic films are controlled to the same value. Further, the ratio of the film thickness of the magnetic films is controlled to 80% to 120%, and the film thickness of the intermediate film is controlled to be in the range of 5 Å to 50 Å. In this manner, a low-noise magnetic recording medium can be provided which has a sufficiently high coercive angle ratio and a sufficiently high coercive force (3000 Oe or larger).

What is claimed is:

1. A magnetic recording medium, comprising:
   a substrate;
   a base layer formed on said substrate; and
   a multiple-film magnetic layer formed on said base layer, said multiple-film magnetic layer comprising two to six magnetic films formed of a material selected from the group consisting of a CoNiCrTa alloy, a CoCrPt alloy and a CoCrTaPt alloy, said magnetic films being laminated on each other with a non-magnetic intermediate film interposed between adjacent ones of the magnetic films, said non-magnetic intermediate film being formed of a Cr alloy containing an element selected from the group consisting of Mo in a range of 2 at % to 12 at %, Ta in a range of 2 at % to 12 at %, Ti in a range of 2 at % to 15 at % and W in a range of 1 at % to 20 at %.

2. A magnetic recording medium according to claim 1, wherein said element contained in said non-magnetic intermediate film is Mo, and a content of Mo is in a range of 2 at % to 12 at %.

3. A magnetic recording medium according to claim 1, wherein said element contained in said non-magnetic intermediate film is Ta, and a content of Ta is in a range of 2 at % to 12 at %.

4. A magnetic recording medium according to claim 1, wherein said element contained in said non-magnetic intermediate film is Ti, and a content of Ti is in a range of 2 at % to 15 at %.

5. A magnetic recording medium according to claim 1, wherein said element contained in said non-magnetic intermediate film is W, and a content of W is in a range of 1 at % to 20 at %.

6. A magnetic recording medium according to claim 1, wherein said substrate consists of an Al—Mg alloy substrate plated with Ni—P, and has a surface that is mirror-finished and then formed with minute protrusions and recesses.

7. A magnetic recording medium according to claim 1, wherein said magnetic films of said multiple-film magnetic layer have substantially the same coercive force.

8. A magnetic recording medium according to claim 1, wherein a ratio of film thicknesses of two of said magnetic films of said multiple-film magnetic layer is in a range of 80% to 120%.

9. A magnetic recording medium according to claim 1, wherein said non-magnetic intermediate film has a thickness in a range of 5 Å to 50 Å.

10. A magnetic recording medium according to claim 1, wherein said base layer is formed of the same Cr alloy as used for said non-magnetic intermediate film.

11. A magnetic recording medium according to claim 1, wherein said non-magnetic intermediate film contains Ta in a range of 6 at % to 8 at %, Ti in a range of 4 at % to 11 at % or W in a range of 3 at % to 15 at %.

12. A magnetic recording medium according to claim 1, wherein said non-magnetic intermediate film contains Ta in a range of 6 at % to 8 at %.

13. A magnetic recording medium according to claim 1, wherein said non-magnetic intermediate film contains Ti in a range of 4 at % to 11 at %.

14. A magnetic recording medium according to claim 1, wherein said non-magnetic intermediate film contains W in a range of 3 at % to 15 at %.

* * * * *